No. 678,414. Patented July 16, 1901.
W. B. MALLORY, J. G. DEADERICK & J. L. ULLATHORNE.
NUT LOCK.
(Application filed Aug. 6, 1900.)
(No Model.)
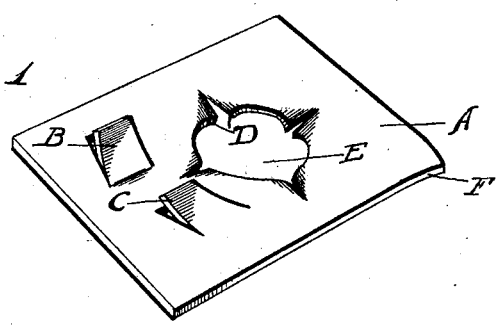
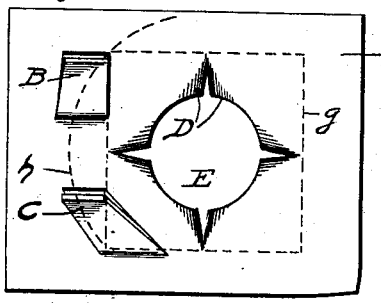
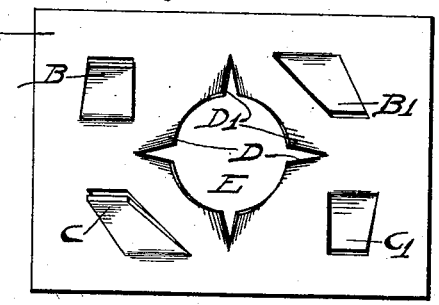
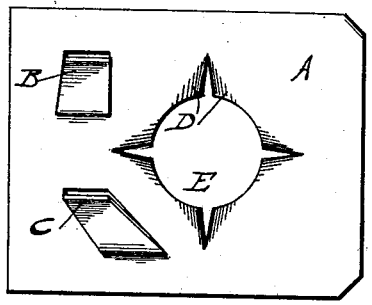
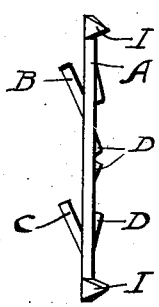
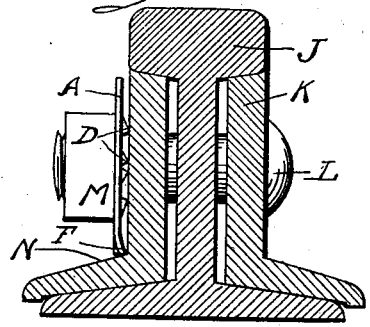
Witnesses
T. F. Kelley.
R. M. McNulty.
Inventors.
William B. Mallory
Joseph L. Ullathorne
John G. Deaderick
by J. H. Weatherford
their Atty.
THE NORRIS PETERS CO., PHOTO-LITHO., WASHINGTON, D. C.

UNITED STATES PATENT OFFICE.

WILLIAM B. MALLORY, JOHN GARLAND DEADERICK, AND JOSEPH L. ULLATHORNE, OF MEMPHIS, TENNESSEE.

NUT-LOCK.

SPECIFICATION forming part of Letters Patent No. 678,414, dated July 16, 1901.

Application filed August 6, 1900. Serial No. 26,089. (No model.)

*To all whom it may concern:*

Be it known that we, WILLIAM B. MALLORY, JOHN GARLAND DEADERICK, and JOSEPH L. ULLATHORNE, citizens of the United States, residing at Memphis, Shelby county, State of Tennessee, have invented certain new and useful Improvements in Nut-Locks, of which the following is a specification.

Our invention relates to improvements in nut-locks, and more specifically to that class of locks in which the bolt is held from turning by some extraneous device and the nut locked in place when screwed up by means of a washer having tongues struck up therefrom which are adapted to engage the side faces of a nut.

The objects of our invention are, first, to provide an absolute lock; second, to make this lock in such manner that it may be readily unlocked by extraneous means, and, third, in a washer nut-lock to provide means to assist in holding the locking-plate while the nut is being screwed up.

With these objects in view our invention consists in the novel arrangement of parts hereinafter described.

Figure 1 is a perspective view of our locking-washer especially designed for railroad use, but suitable and preferable for all uses. Fig. 2 is a face view of this washer. Fig. 3 is a face view of this washer symmetrically designed. Fig. 4 is a face view of our washer modified for use on wood. Fig. 5 is a side elevation of this washer. Fig. 6 shows a section of a standard T-rail with the lock in place and nut just seating lock on the angle-bar to show action of the corner turned inward in a lock for this class of work.

Referring now to the drawings, in which the same letters of reference indicate the same or like parts in all the views, A is a washer made of spring metal and preferably of rectangular shape, as shown in these views, which washer has tongues B and C struck up on one side thereof. These tongues are situated at such distance from the bolt-hole E that they will come entirely outside of the nut and will engage the side faces of the same.

In Fig. 2 we show by the dotted lines *g* the position which a square nut would have when held from unscrewing by the locking-tongue B. A one-eighth turn of the nut in this case is necessary to bring another face of the same into engagement with the tongue C. It is known that spring-tongues have heretofore been used, which tongues were struck up from the face of the washer, as in this case. Especial attention is directed to the disposition of the tongues B and C. These tongues in our lock are placed adjacent to each other and at the same end of the plate.

Another feature of our invention is that the point of the tongue C is situated vertically below the point B and that these points extend outside of the extreme limit of space covered by the nut.

In Fig. 2, where *g* shows the dotted position of the nut when locked in one position, *h* shows the path of the corner of the nut or the extreme limit of the space covered by the nut. The points B and C are so formed that they extend beyond this circle *h*, and being placed in proximity to each other they may both be depressed at once to allow the unscrewing of the nut. When these tongues are so placed, too, they may be depressed without obstructing the use of the wrench on the nut.

While one of the tongues B or C is always partly under the nut and to that extent acts as a spring, we find that this is not altogether satisfactory for railroad use. In this case we slot the washer outward from the bolt-hole and depress the corners D thus formed. These corners so depressed form a spring or series of springs and give an elastic bearing for the nut, which springs take up the expansion and wear of the bolts and nuts. Where the washer is used on wood, we find that these corners D so depressed form an effectual means of preventing the rotation of the plate. We find, though, that where the wood is soft or the hole excessively large these points do not hold. In this case we provide points *l*, turned down, as shown in Figs. 4 and 5, which points are forced into the wood as the nut is screwed up, or driven in with a hammer, if necessary. We have shown two points *l*; but one only or any number may be used, if so desired.

Referring again to Figs. 1 and 2 and Fig. 6, in which U is a T-rail, K the angle-bars, L the bolt, and M the nut, we find that in screwing up the nut there is a tendency for the washer to work around and outward and down the sloping part N of the angle-bar K. To counteract this tendency, we have turned the edge F inward so that it rests squarely against the sloping part N of the angle-bar, and thus counteracts the above-mentioned tendency to slip. The points D, which are shown in Fig. 6 as just seating against the angle-bar, will also counteract this tendency by scoring or cutting into the plate.

In Fig. 3 we illustrate a modification of our locking-washer, which modification consists in turning one set B' C' of the tongues down and in raising one set of the spring-points D' upward, whereas the others D are depressed. This makes the washer symmetrical and permits of its being placed on the bolt with either side out, making it absolutely impossible to put it on wrong.

In this specification we have shown only two tongues B and C; but we do not wish to confine ourselves to that number, and desire to use any number so long as they are placed in a single group and with their points so disposed that they may be depressed at one time by a single tool without interfering with the use of a wrench on the nut.

What we claim, and desire to secure by Letters Patent of the United States, is—

1. A nut-lock comprising an integral washer of spring metal having a plurality of tongues struck up therefrom in close proximity to each other, said tongues having broad ends, a part of which extend a considerable distance beyond the sweep of the nut, whereby the tongues are adapted to be depressed by a single instrument for removing the nut, said washer also having a plurality of depressed spring-points arranged about the hole in the washer and formed by making cuts outward from the hole and curving downwardly the corners thus formed on both sides of the cuts, so as to prevent the turning of the washer in either direction, substantially as described.

2. A nut-lock comprising an integral washer of suitable material, having a nut-engaging means formed thereon and a plurality of depressed spring-points formed by cutting outward from the bolt-hole and turning down the corners thus formed, so that all of said corners on both sides of the cuts will engage the surface adjacent to the washer and prevent the said washer from turning in either direction, substantially as described.

In testimony whereof we have signed our names to this specification in the presence of two subscribing witnesses.

WILLIAM B. MALLORY.
    JOHN GARLAND DEADERICK.
    JOSEPH L. ULLATHORNE.

Witnesses:
    T. F. KELLEY,
    W. M. KYLE.